(12) United States Patent
Stapefeld et al.

(10) Patent No.: US 6,229,988 B1
(45) Date of Patent: May 8, 2001

(54) METHOD OF AND APPARATUS FOR BATTERY AND SIMILAR POWER SOURCE CONSERVATION IN PERIODICALLY OPERABLE PORTABLE AND RELATED RADIO RECEIVERS AND THE LIKE

(75) Inventors: Norval Stapefeld, Brookline, NH (US); Dan Kotlow, Marlborough; Sheldon Apsell, Newton, both of MA (US)

(73) Assignee: LoJack Corporation, Dedham, MA (US)

( * ) Notice: Subject to any disclaimer, the term of this patent is extended or adjusted under 35 U.S.C. 154(b) by 0 days.

(21) Appl. No.: 09/082,346

(22) Filed: May 20, 1998

(51) Int. Cl.⁷ ............................... H04B 7/00; H04B 1/16
(52) U.S. Cl. ..................... 455/38.3; 455/343; 455/574
(58) Field of Search ........................... 455/38.3, 231, 455/32.1, 343, 574, 404, 410, 411; 340/825.09, 825.54; 370/311; 320/136

(56) References Cited

U.S. PATENT DOCUMENTS

| | | | |
|---|---|---|---|
| 5,241,542 | * | 8/1993 | Natarajan et al. ..................... 370/311 |
| 5,392,287 | * | 2/1995 | Tiedemann, Jr. et al. ........... 370/311 |
| 5,428,820 | * | 6/1995 | Okada et al. ......................... 455/38.3 |
| 5,532,935 | * | 7/1996 | Ninomiya et al. .................... 700/296 |
| 5,627,882 | * | 5/1997 | Chien et al. .......................... 455/464 |
| 5,684,404 | * | 11/1997 | Millar ..................................... 324/426 |
| 5,821,873 | * | 10/1998 | Lerner et al. .................... 340/825.44 |
| 5,929,604 | * | 7/1999 | Irvin ..................................... 320/136 |

\* cited by examiner

*Primary Examiner*—Dwayne Bost
*Assistant Examiner*—Erika A. Gary
(74) *Attorney, Agent, or Firm*—Rines and Rines

(57) ABSTRACT

In a signal receiving apparatus as, for example, that used in the monitoring in a stolen vehicle transceiver of the presence of sequential transmitted signals specifically requesting that transceiver to respond to enable tracking the vehicle, wherein the receiver is powered by a consumable energy source of predetermined budgeted lifetime and adapted to operate between quiescent energy-saving and energized energy-consuming states for performing such sequential signal monitoring, desired signal identifying and related functions, a method of and apparatus for insuring the availability of energy to be able to perform such functions within said predetermined budgeted life time, that comprises, allocating budget time intervals for periodically operating the receiver intermittently in energized state to enable the performing of such functions as monitoring for such signals; and, in the event of inordinate energy consumption during such operation, that, if continued, would render the operation out of overall allocated time budget, adaptively skipping time intervals with the receiver quiescent, sufficiently to get the operation back on overall time budget.

30 Claims, 4 Drawing Sheets

METHOD OF AND APPARATUS FOR BATTERY AND SIMILAR POWER SOURCE CONSERVATION IN PERIODICALLY OPERABLE PORTABLE AND RELATED RADIO RECEIVERS AND THE LIKE

The present invention relates to the powering of portable and similar radio receivers and the like, being more particularly directed to power conservation for such receivers having periods of dormancy and wake-up, as for the monitoring of signals intended for particular of the receivers that may be transmitted from transmitters covering areas where the receiver may be located or may otherwise enter.

BACKGROUND OF THE INVENTION

The problem of powering such portable or similar receivers as by expendable power sources, such as batteries and the like, has received considerable attention in the art over relatively recent years, particularly in connection with portable cellular telephones and pagers and the like, and a large number of patents have been issued to try to address power or battery conservation to ensure long functioning of the receiver. Typical of such approaches in the field of cellular telephones and mobile communication systems, are disclosed, for example, in U.S. Pat. Nos. 4,860,005; 4,961,073; 4,987,317; 5,023,932; 5,031,231; 5,054,052; 5,5,089,813; 5,095,308; 5,128,938; 5,140,698; 5,150,364; 5,175,870; 5,230,084; 5,237,603; 5,293,639; 5,301,225; 5,376,975; 5,384,564; 5,392,287; 5, 392,457; 5,392,462; 5,404,578; 5,406,613; 5,428,638; 5,440,229; 5,440,650; 5,448,756; 5,465,392; 5,465,394; 5,471,655; 5,475,374; 5,483,672; 5,487,181; 5,507,039; 5,507,040; 5,517,679; 5,519,762; 5,530,911; 5,541,976; 5,541,929; 5,542,116; 5,542,117; 5,561,693; 5,568,513; 5,570,025; 5,590,396; 5,594,951; 5,606,313; 5,606,728; 5,606,739; 5,613,235; 5,627,833; 5,628,054; and 5,640,441. Typical proposals adapted for such problems in radio pagers are exemplified by, for example, U.S. Pat. Nos. 4,652,875; 4,691,382; 4,745,408; 4,755,816; 4,779,091; 4,940,975; 5,001,471; 5,025,251; 5,150,954; 5,193,211-2; 5,274,843; 5,420,576; 5,459,457; 5,508,688; 5,556,081; 5,625,884; and 5,649,314. Other communication and more general power saving or controlling circuits are exemplified in U.S. Pat. Nos. 4,821,309; 4,893,094; 4,903,335; 4,905,271; 4,977,611; 4,996,526; 5,027,428; 5,101,510; 5,103,192; 5,109,530; 5,111,201; 5,204,986; 5,222,245; 5,421,691; 5,251,325; 5,265,270; 5,278,521; 5,299,117; 5,327,172; 5,357,245; 5,359,594; 5,361,397; 5,389,930; 5,422,681; 5,423,057; 5,423,077; 5,430,441; 5,438,696; 5,438,701; 5,440,556; 5,463,382; 5,465,400; 5,513,385; 5,524,021; 5,525,992; 5,533,058; and 5,592,171.

As will hereinafter more fully be explained, the present invention primarily relates to a transmitter-receiver environment very different from cellular and paging communication systems, being concerned, rather, with vehicle-recovery systems of the type described in U.S. Pat. Nos. 4,818,998 and 4,908,629, and currently in operation under the trademark "LoJack", (described, also, in the assignee's 1989 brochure entitled "LoJack Stolen Vehicle Police Recovery Network"), where a vehicle-carried transponder receiver can only receive an activation signal from a transmitter or transmitters in its area intended for that receiver when the vehicle has been reported missing and the transmitter or transmitters is or are so alerted to transmit such an activation signal. In current vehicle-recovery systems of this character, the vehicle receiver is continually powered, as from the car battery; but the present invention looks to miniaturized receivers that can be well hidden in the vehicles and that are not dependent upon the vehicle battery. The receiver, rather, is to have self-contained limited-life small consumable batteries, the power drawn from which is thus to be conserved and budgeted for use only accordingly to wake-up a normally dormant receiver to look for a possible activation transmission specifically intended for it, and to stay awake (with transponder response where appropriate) only if its stolen or missing vehicle activation signal is being transmitted—otherwise, to return to dormant condition.

This is therefore a very different environment embracing very different problems underlying power conservation than those involved in the above-mentioned cellular phone or paging environments, such that energy-conserving techniques proposed for the latter, including those described in the above groups of patents, are inapplicable and insufficient for the purposes of the present invention. The different environment of such vehicle-recovery systems, indeed, unlike the synchronized paging transmitters sending the same message at the same time, or the two-way cell system control of cellular phones, resides in the vehicle-recovery system use of a series of transmitters over a geographical area, say eight transmitters per control center, each of which (when a vehicle is reported stolen) transmits sequentially, in a different time slot, with the time slots being controlled accurately in time either from a time standard received from WWV (the national standards bureau in Boulder, Colo.), or from the time standard of global position satellites (GPS).

Since paging receivers are most often to be worn on the person, small size and weight are major marketing considerations, and in turn make reduced battery size and longer battery operating life of great concern. Paging, however, operates primarily one way, although there are some two-way systems, and such differ from the vehicle recovery system of the invention in two major functions. First, in a paging network, which consists of many transmitters, there is essentially a seamless network of transmitters in its coverage area, and the transmitters are synchronized so that all the transmitters transmit the same message at the same time. The transmission system does not need to know where the receiver is located so long as the paging receiver is located somewhere in its coverage area so that it will receive the message. This opens up some significant power-saving opportunities and advantages in the paging world. They can set timing; they can have the receiver turn itself off and come back on at a specific time; and also they can set that time so that the receiver knows exactly when its message is going to be sent. The receiver, moreover, does not have to know where it is in order to know what time to listen.

In the vehicle recovery system, on the other hand, the same message is not sent at the same time over the transmitter network geography; and, since the primary mode of use is in a vehicle, there is every reason to suspect the vehicle will be moving from one area to another. Since, as before pointed out, the vehicle-recovery transmitters are operated in a sequential system, further as opposed to a synchronized paging system, the receiver has no way of knowing where it is when it listens for a signal and requires highly novel algorithmic assistance, which is entirely foreign to paging receivers and their operation. Another advantage paging receivers have over vehicle recovery systems, of course, is that there are many more of the synchronized transmitters around, so the paging signals are many times greater than those of the signal environment of vehicle-recovery systems.

Cellular phones take a somewhat different approach in phone energy conversation systems, moving from area to area, but having the ability to communicate with the cell station which knows the parameters and can tell the cell phone to listen. Since the cell system controls the cell phone and is passing it from cell to cell, it can hand off the appropriate parameters as to just when to listen. The vehicle-recovery system of concern with the present invention, as earlier noted, does not have a two-way system and has no way of breaking into the network and requesting the information needed. The problems of conserving receiver battery power are thus much harder to deal with because the receiver does not know where it is at any given time and it can never be sure of exactly when to listen. When it does get out of phase or synchronization, moreover, it does not have the ability of the cellular phone systems to send a message back to the controlling environment and request information on what to do.

The vehicle receiver, when the vehicle is stolen, can be anywhere; in fact, in the normal course of such events, it will be moving from one area to another area. While this is not a problem if the receiver is turned on all of the time, such operation consumes the battery continuously and cannot solve the conservation problem underlying the present invention; namely, fundamentally, turning the receiver off when there is no existing transmitted signal for it, and with minimal turn-on or wake-up for monitoring for such a signal. When the receiver is off, indeed, it also has to know at what time to turn back on to look for a next message signal intended for it. If it has moved from one geographical area to another geographical area, then the time at which the receiver must activate itself has now changed; and all this without knowledge as to what that new time is or the location of the receiver.

The present invention has admirably solved these problems, providing a highly novel technique of (1) knowing when to wake up the receiver so as not unduly to use available power listening when there is no information actually transmitted, and (2), when the receiver is awakened and activated, consuming power in a highly intelligent manner that rapidly determines if the signal messages are not intended for that receiver, and accordingly turning off, so as not unduly to waste power decoding messages not intended for the receiver.

OBJECTS OF INVENTION

The primary object of the invention, thus, is to provide a new and improved method of and apparatus for battery and similar power source conservation in portable and similar radio receivers and the like that are particularly tailored for the unique problems of vehicle-recovery systems that do not exist in either cellular phone or paging and related system environments, as above described.

A further object is to provide such an apparatus embodying a novel technique for controlling the budgeting of consumable battery power to minimize wake-up times for listening for transmissions, intelligently using power upon wake-up to determine if a transmission is actually intended for that receiver, and compensating for used power by skipping monitoring time intervals and by fixed dormant periods, calculated to ensure the presence of adequate power for ultimate reception of intended transmissions after a vehicle has been stolen.

Still another object is to provide a novel technique for conserving battery or similar power in receivers and electronic apparatus more generally.

Other and further objects will be explained hereinafter and are more particularly delineated in the appended claims.

SUMMARY

In summary, from one of its important viewpoints, the invention embraces a method of energy source utilization and conservation at a radio receiver intended to receive only occasional radio transmissions addressed to that receiver and possibly occurring during predetermined overall transmission time schedules, that comprises, allocating successive short time periods of possible equal-energy utilization by the receiver totaling an energy budget capacity of the intended lifetime of the receiver energy source; momentarily activating the receiver by applying energy thereto during such a short time period only adequate for the receiver to determine the possible presence of a radio transmission addressed to that receiver; thereupon de-activating the receiver by terminating energy applied thereto in the absence of receipt of such addressed transmission; and skipping subsequent time periods of possible activation corresponding at least to the time period(s) utilized in such determination when no such transmission was found to be present, in order to insure overall conformance to said energy budget, but adjusting such skipping to insure the activation of the receiver at some time within the predetermined transmission schedules, thereby enabling the receiver judiciously to look for transmissions addressed to it only at correct times and only for short time periods, while spending the rest of the time in an energy conservation deactivated mode.

Preferred and best mode designs and technique details are later presented.

DRAWINGS

The invention will now be explained in connection with the accompanying drawings, FIG. 1 of which is a timing diagram for the transmitter sequencing of a vehicle-recovery transmitter system of the preferred type described; specifically, the "LoJack" type implementation;

PREFERRED EMBODIMENT(S) OF THE INVENTION

Figure 1:
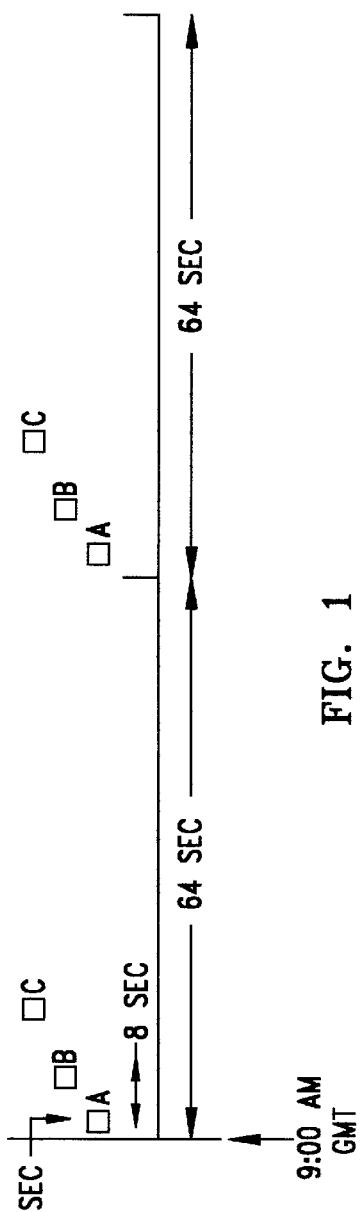

Preliminary to describing the details of the preferred implementation of the technique and apparatus of the invention, a review of the transmission environment of the illustrative vehicle-recovery system is believed in order, as well as the overall specifications for the apparatus of the invention, which has been designed to be operable over, for example, a multi-year period, say three to five years or more, before requiring replacement.

As earlier described, in prior and present vehicle recovery systems of this character, the receiver of the hidden vehicle transponder was continuously on, looking for a transmitted signal with its activation identification code or ID. This approach has proven to be very effective, but it would consume a considerable amount of power over the course of three years. In fact, for a stored vehicle it could not operate from a car battery for longer than several months before it would drain the car battery.

In the said "LoJack" type system, for example, eight sequentially time-slotted transmitters are employed designed to transmit at least once every sixteen minutes. In accordance with the preferred technique of the present invention, each vehicle receiver is awakened by powering, at eight second intervals, ultimately going to sleep or becoming dormant and thereby conserving power for three hours in the event that no transmission is received within four sixteen-minute intervals (i.e. within about one hour)—a time sufficient to guarantee the reception of at least one transmission if the vehicle is within the control area.

As before described, there are two primary issues. One is knowing when the receiver is to wake up, so as not to use available power to listen when there is no information transmitted. The other is, when waking up, to use the power in an intelligent manner, rapidly determining that a received transmission is not a message intended for that receiver, and thus turning off without wasting power decoding messages that are not intended for that receiver.

If, during the eight-second wake-ups, no transmitted signal is received for a sixteen-minute interval, and with the system guarantee that the transmitters will indeed transmit at least once every sixteen minutes, the receiver will shut down for some hours, say three—enough time to get back on a power budget to insure operability over the battery's intended several year lifetime (for example, three years), without running out of power. In this illustration, sixteen minutes up; three hours down.

If, on the other hand, the receiver wakes up and receives a transmission, it must promptly analyze if that transmission is worth paying attention to; i.e. is actually intended for that receiver ID.

As to this, there are, however, only two possibilities. Either the transmission is intended for this particular receiver unit, or it is not. If it is, then the signal is decoded and the transponder replies to permit police tracking of the vehicle—a process where the power budget is no longer of concern. If not, however, basically the receiver listens every eight seconds since, as before stated, some transmitter (if there is one in the area) will have a transmit opportunity every eight seconds. Should the receiver receive a signal, it must then promptly determine if it is intended for that receiver—otherwise, to conserve power, it must terminate listening and shut down. To get back on a power budget from this process, as later explained, multiple eight-second skips may be instituted, depending upon how many messages might have been examined. Even if the transmission is not intended for that receiver, it can serve to reset the timing window, as later explained.

In the eight-second channel searching, however, there are errors, requiring the allowing of a window around that eight-second point to accommodate for such errors. The window grows because of the inaccuracy of the clock, and the longer a receiver goes without getting a message, the bigger the window has to be because the clock is fast or slow.

The most likely scenarios for no signal reception within an hour are either that the vehicle has gone out of range for the system (on vacation or on a trip), or the vehicle is in an underground parking garage, which could happen in a downtown environment and where it is likely that the vehicle is going to be there for an extended period of time, such as all day. It would not, of course, be desirable to consume a whole lot of battery capacity because of such situations.

After the system has gone to sleep for three hours, for the above example, then it wakes up and repeats the same process above-described. When it wakes itself up, however, the receiver is now completely out of synchronization, requiring an initial process to find where the transmission is.

As before explained, the receiver periodically wakes up for sixteen minutes, looking often enough so that if any transmission occurs it will receive such transmission. It will not necessarily be able to decode it, but it will receive it. If it does receive some transmission, it will, according to the invention, set a time window and look for the same transmission every 64 seconds after the transmission. If it receives such, then it is ready to go into a synchronizing mode, also later more fully discussed. The minimum message size is set at, say, 100 milliseconds, so the receiver wakes up every 80 milliseconds. If there is a transmitted message of any kind, it is thus bound to cover a wake time. If the receiver "sees" a message from, say, transmitter time slot one, it may skip maybe time slot two or three—as many as it needs to, but not more than eight at a time, and not so many that it won't look at the next time slot one, in order to keep within the power budget.

When skipping messages, the system gives priority to the time slot in which it received its last message, the design of the invention in this example, permitting a maximum of eleven messages. If the receiver only sees eleven messages that are supposed to be there, then it would never skip more than six slots; i.e. time slots from other transmitters (say, transmitters 2–7). Basically the receiver skips a time slot of the other transmitters for each two messages. As the vehicle moves into a new area, the receiver is still looking every eight seconds. The chances are that because it still is looking at slices of time slots, there is some probability that in fact it will pick up the message in one of the other time slots, assuming one of the eight seconds, because it comes back to itself every 64 seconds. If it picks up the messages of one of these other eight time slots, then it just continues working. If it doesn't, and the new transmitter is in one of these time slots that was skipped to stay within the power budget, its message will be picked up the next time since the receiver only skips so many, and then stops skipping to look again every eight seconds. Transmitter coverage of the area should not permit gaps; and because time synchronization of all the time slots is fixed and set by the same clock, the receiver is in sync on time slot one, and it then remains in sync on time slot two, etc. Unless the vehicle moves out of range for any transmitter for a period of time long enough to lose synchronization, therefore, that is not a problem—time slot one and time slot two being only eight seconds apart, and providing a fairly seamless system. In the situation where the vehicle is in range of multiple transmitters, the receiver just listens to them all, providing information that is redundant, but being no different from the situation of current vehicle recovery operations where the receiver is listening all the time.

FIG. 1 shows the transmit schedule, divided into 64 second intervals, with each transmitter of the illustrative 8 transmitters in the area transmitting every 64 seconds, and each of the other transmitters sequentially transmitting at eight second offsets to the previous one, as before described. The whole cycle starts at a particular time of day, determined, as before stated, by the national bureau of standards WWV radio signal or by the GPS absolute times of the day—all transmitters being on the same clock. Because the individual transmitters have no communication between one other, the time standard has to be absolute, as opposed to a relative time standard. The A, B and C represent successive transmitters, geographically positioned, with such transmit opportunities eight seconds apart. Transmitter B will start eight seconds after A, and C will start eight seconds after B, if they have a transmission to make. The half-second indicated in FIG. I shows the actual transmitter starting a half-second into its slot transmission opportunity.

Figure 2:
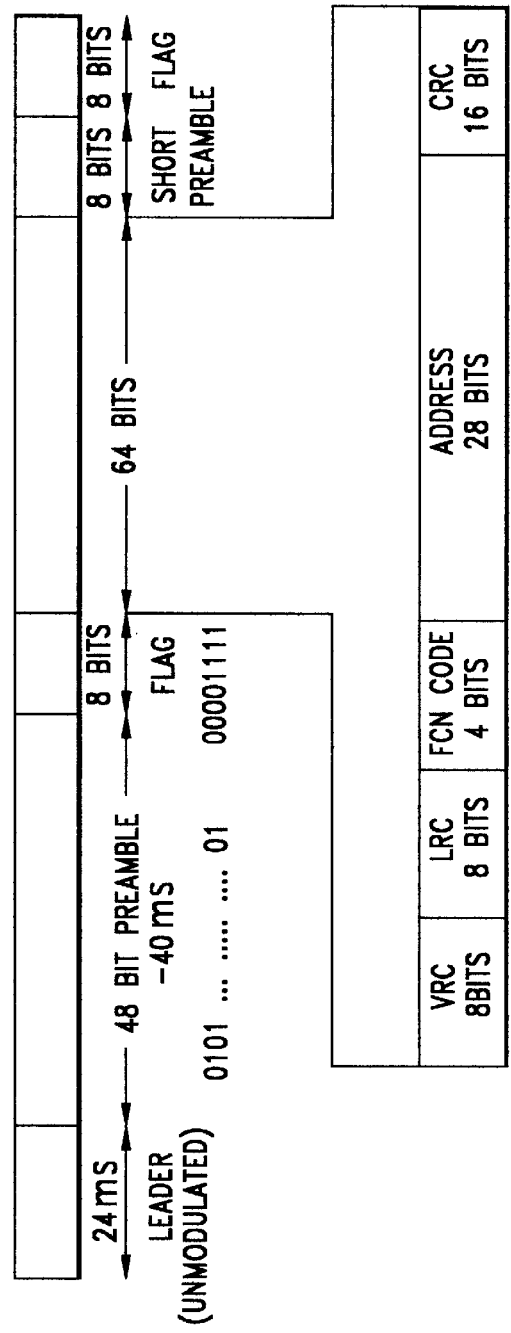
FIG. 2 is a diagram of the preferred data frame in each transmitted message for the purposes of the present invention.

In FIG. 2, the message bursts are shown in data frames, assembled together into a burst of up to eleven messages, as before described. The minimum size of message transmitted may be, for example, as little as 124 bits, and as large, in the case of there being all eleven messages, as about 800—the message thus being of variable width. The burst always starts with 24 milliseconds of unmodulated signal, termed "LEADER" in FIG. 2. Then begins a 48-bit preamble—alternating 0s and 1s—which take about 40 milliseconds, as shown. As the receiver searches its window, waking up every 30 milliseconds to look, it is bound to catch the bursts somewhere in the preamble; in fact, with 10 milliseconds to spare, which is sufficient to accommodate for the various timing errors which can arise. At the beginning of each individual message, there is provided a FLAG pattern, shown as four 0s followed by four 1s, which identifies to the receiver where the data frame starts.

After each frame, before the second and preceding frames, there is also provided a SHORT PREAMBLE of 8 bits, so-labeled, before the next FLAG counter. The message continues in this fashion up to eleven messages, as before stated. Initially, the receiver unit will wake up in the 48-bit preamble, and it will continue to listen until it sees the FLAG character. The receiver then knows that it is looking at data, and it will start to compare the data, bit by bit, with what that receiver would be expecting to receive if the message is intended for it, until there is a specific discrepancy. Upon detecting such a discrepancy, (for example, in the VRC or LRC bits), the receiver will go back to sleep and not continue message decoding, waking up in the SHORT PREAMBLE of the next message. In other words, the receiver looks at the VRC bits, for example, and decides this message is not intended for it. It thereupon goes to sleep and wakes up before the SHORT PREAMBLE to accept the FLAG and then the next message, repeating the process. There being information specific to the address and reflecting the whole message contained in the leading bits preceding the address, the determination as to whether the transmission is or is not intended for that receiver is promptly made evident, thereby avoiding the wasting of energy in decoding the address bits.

The middle part of the message—the function code FCN and the ADDRESS—contains the parts that carry the information intended for the particular receiver. The ADDRESS bits identify the particular receiver unit (ID). The function code FCN controls activate/deactivate instructions for the transponder, speed up of transmissions, (as described in said LoJack patents), and instructs the receiver what to do. For present purposes, however, the only function of interest is the activate mode for the receiver unit transponder to reply.

There is, however, information in the CRC bits (check on the address port) and LRC bits (computer control) about whether the receiver is receiving a message intended for it, without the receiver having to listen to the full 64 bits of message—a further power-saving shut-off opportunity. These checkbits enable a rapid determination of whether this is a message for that receiver and thus, for power saving purposes, eliminate listening to the rest of the message.

Figure 3:
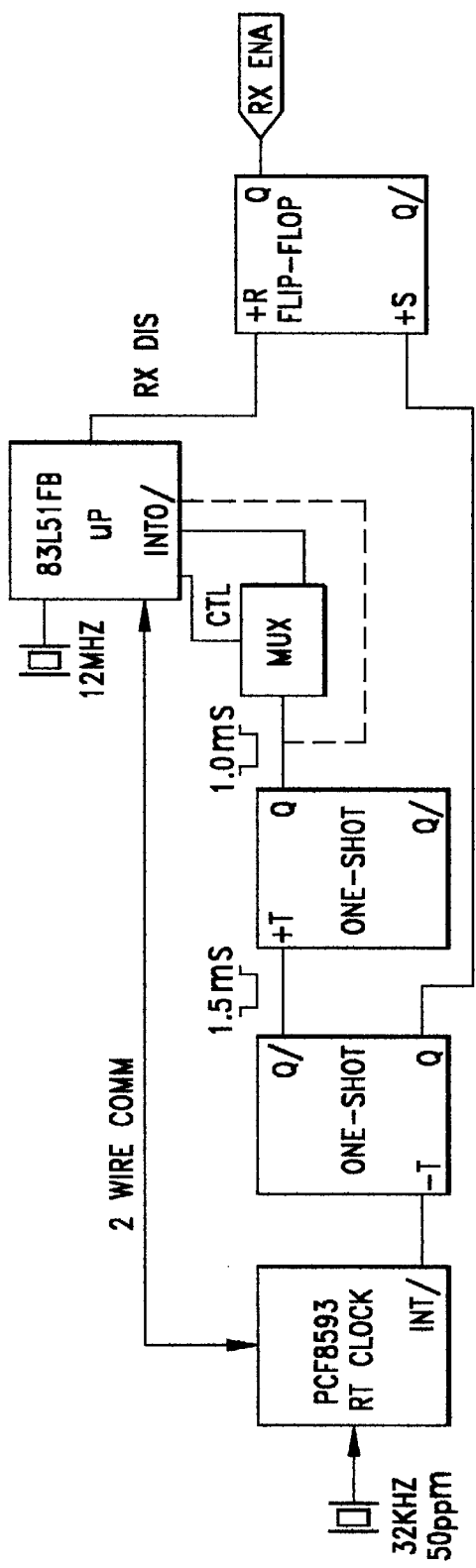
FIG. 3 is a diagram showing the timing of the wake-up and turn-off control of the receiver by its microprocessor.

The alarm clock check, by which the receiver is commanded to wake up at a certain time, is preferably crystal-oscillator controlled—50 milliseconds per minute, as shown at CLOCK in FIG. 3. The diagram illustrates that when the alarm clock checks a wake up signal, it notifies the receiver RX, which requires the most time to get ready. A mechanism is provided whereby 1.5 milliseconds passes before waking up the microprocessor MP, and then another millisecond to complete the job of waking up the microprocessor before it starts giving instructions to the receiver RX, and is delivering valid data to it. So, 1.5 milliseconds of the full amount of power that the microprocessor MP will be drawing is saved over what would have been expended by energizing the receiver RX at the same time, insuring that each wake up takes as little power as possible.

The MUX (multiplex) enables sharing between this function and other functions later described in connection with FIG. 4.

As before stated, the microprocessor MP is accurately turned on under crystal oscillator control. On the right is shown the signal RXDIS that goes to the actual receiver RX to turn it on, and with control for resetting for the process to start all over again and enable turning the receiver off and turning it on again at the proper time.

Figure 4:
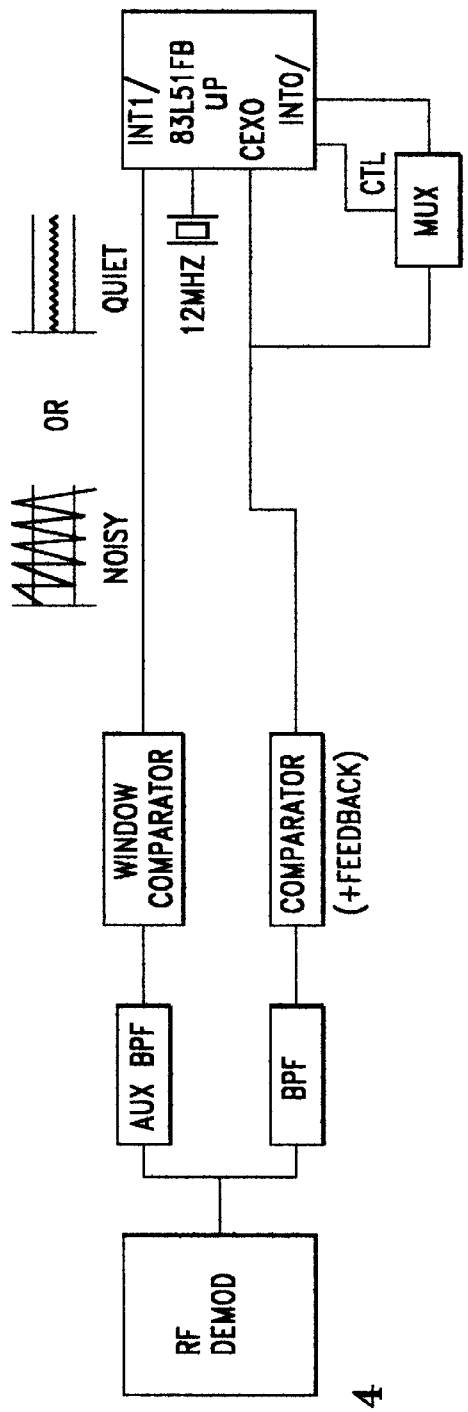
FIG. 4 illustrates the channel signal sense and decode architecture of the invention.

The transmitter channel sensing and decoding architectures are illustrated in FIG. 4. The channel sensing determines if a transmitted signal is actually there or not. Since the transmitters are not obligated to transmit at every eight second interval (as where there is no reported vehicle theft), there may or may not be a signal there. If there is not, the receiver, in waking up, wants to find that out as soon as possible so as not to waste power trying to decode the message of FIG. 2. The system looks at two aspects of the incoming signal. The signal first is demodulated at DEMOD and then stepped down from RF to audio, to provide a code. The code is the switching between two audio frequencies, for example, (1200 hertz and 1800 hertz),—one frequency representing a digital "1", and the other, a "0". The succession of these frequencies, each having a duration of 840 milliseconds, decodes as a "1" or "0", depending on the frequency, as shown to the left in FIG. 4. The bottom signal path shows passing through a band pass filter BPF for isolating frequencies to generate a signal which is one of the two levels creating the digital 1 and 0 signals that the processor can use. The microprocessor MP looks at these transitions from 1 to 0 and 0 to 1, and tries to make a decision as to whether they are occurring at a frequency that represents data of interest, which should be coming at 1200 or 1800 a second to be actual data.

Another factor that goes into this decision, results from the passing of the demodulated signal also through an auxiliary band pass filter AUX BPF (upper path in FIG. 4) which picks out frequencies substantially above the range where the data is to be sent. If there is a signal present, nothing would be expected on that upper signal path, so that passing it through a window comparator, so-labeled, would produce a voltage that stayed at 0—a quiet line, indicated at QUIET. If, on the other hand, the signal is not present, then noise would be obtained and such noise would occasionally cause a voltage (NOISY) to get outside of the window and be fed to the microprocessor MP. The microprocessor, in accordance with the invention, measures the percentage of the time which such voltage is outside of the window, and uses that as a metric for judging how much noise there is, as opposed to signal, thereby influencing its ability to decode—i.e. when the most signal-to-noise ratio is produced. This procedure, therefore, provides a rough metric of signal-to-noise ratio, and if this metric is not good enough, then the receiver will not try to decode—again preserving power.

The MUX (multiplex) allows the choice as to the wake up signal in FIG. 3 or the data in FIG. 4 to go to the port labeled IMT0 in the microprocessor MP. When the receiver is asleep, the wake up signal is allowed to come in; when awakened, then the receiver is allowed to come in, FIGS. 3 and 4, respectively. Ignoring the MUX, FIG. 3 shows the situation when the receiver is asleep; and in FIG. 4, when it is awake, the CTL line indicating the control.

Figure 5:
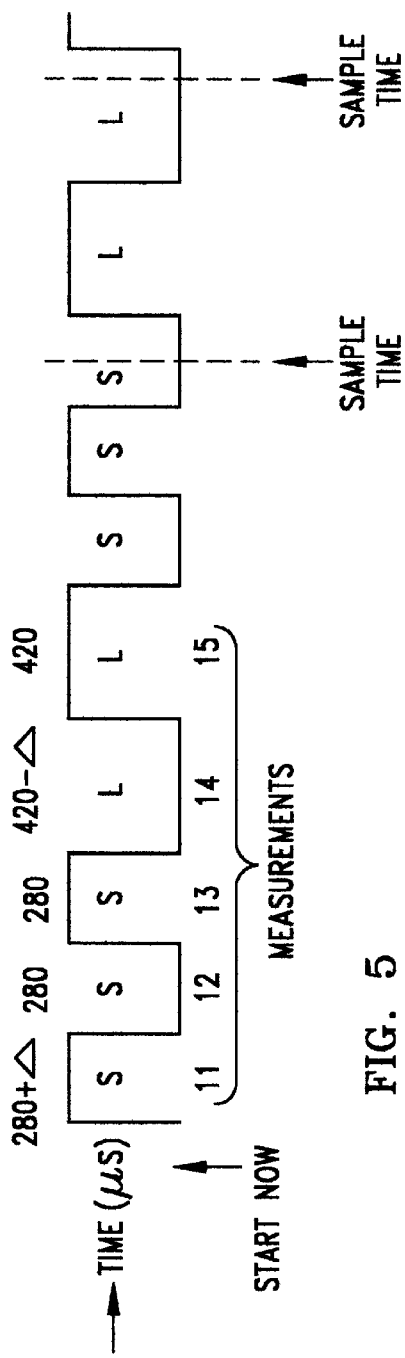
FIG. 5 illustrates the data waveform (assuming the reception of data) to the microprocessor during a preamble of the received message.

Turning, now, to the before-described synchronization process, reference is made to the symbol synchronization of FIG. 5 that illustrates what the data waveform, assuming the reception of transmitted message data, should look like, to the microprocessor during a message (8-bit 0101 etc. preamble of FIG. 2); i.e. alternating code 0s and 1s being transmitted. The 0s (S) are coded at the 1800 Hertz waveforms of FIG. 4 over a period of 840 microseconds. The first three in the diagram of FIG. 5 are 0s. During the 840 microseconds, the voltage could go updown, or it could go down-up-down, the symbol S representing short intervals of the 1800 Hertz code, ("0"). The intervals between transitions of the voltage level, are three short intervals each of 280 microseconds. If looking at a "1", which is coded at 1200 Hertz as before explained and represented at L, only two intervals between transitions are seen, each of 420 microseconds. By distinguishing between these, decoding is effected. The only possible difficulty is that the start does not have to come where it is shown in FIG. 5; but it could rather come in at any time during the 0101 preamble signal of FIG. 2. The problem of symbol synchronization is to figure out where it actually came in, and to do it without spending a long time (and energy).

The solution of this problem, in accordance with the present invention is to measure between transmissions. If the receiver wake-up is where it is shown in FIG. 5, then SSSLL will be the sequence. But, if the wake-up is 560 microseconds later, then the sequence is SLLSS; and a distinction is required to differentiate between these. The technique of the invention involves measuring 5 time intervals and looking at the sums of alternate "1"s ($t_1+t_3$, $t_2+t_4$, $t_3+t_5$, $t_4+t_1$ and $t_5+t_2$ shown in FIG. 5). Whichever one of those sums is the smallest, the first number of that sum corresponds to the first S. If, therefore, the wake up is at the time shown in FIG. 5 (START), then $t_1+t_3$ will be only 560 microseconds; $t_2+t_4$ would be 700; $t_3+t_5$ is 700; $t_4+t_1$ is 700; and $t_5+t_2$ is 700. Had the wake-up occurred 500 microseconds later, say with the START arrow pointed to the third S where the $t_3$ is written, this would then be called $t_1$, and it would be $t_4+t_1$. Based on these measurements, an estimate can therefore be made of where that sample time is—where the last L stops and the first S starts. The preferred technique is to go ⅚ of the way into the symbol for sample time, because that is the decision point between deciding what is a "1" and which is a "0". Whichever one is chosen, an average is calculated on these 5 measurements. Averaging those estimates, moreover, will cause individual errors to be cancelled out. After that, the system decodes "0"s and "1"s—and every time it changes, it is three Ss; and when it doesn't, it is two L's. The reason for going ⅚ of the way is because that is reasonably as far as one can get from transition time and have the most margin.

Figure 6:
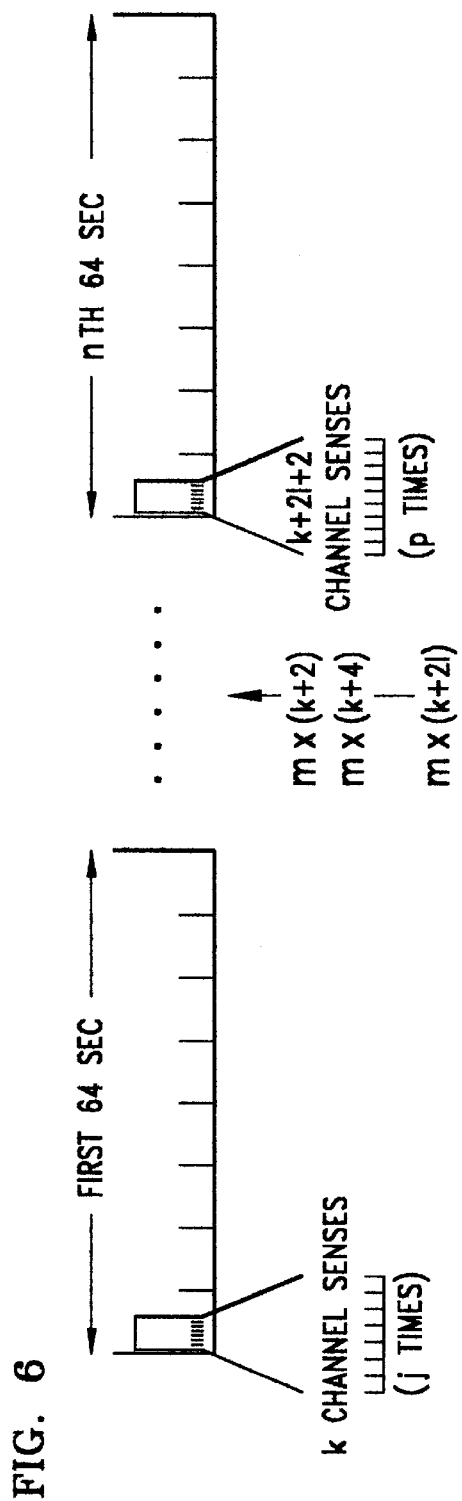
FIG. 6 illustrates a search pattern for one of the eight vehicle-recovery transmitters in the above system.

FIG. 6 addresses the previously described windows of wake-up, illustrating a search pattern for one of the exemplary 8 transmitter channels, it being understood that in normal operations, when in sync with the system, there are really 8 of these patterns of FIG. 6 in operation at the same time, eight seconds apart. In FIG. 6, where one transmitter starts out in a certain time window, and if no transmitted signal is received every 64 seconds, that time window is expanded 30 milliseconds. Every 64 seconds that the receiver fails to see a signal adds some uncertainty as to how far to go with respect to that transmitter; so the system widens the window every 9 periods by 30 milliseconds on both sides of that window. The "k" channel sensing in FIG. 6 represents the illustrative 8 transmitters, starting with a window with k channel sensors and repeating that j times; and then, every m of the 64 seconds, 2 are added, up to n 64 second intervals. The product of m×k=2, or m×k=4, etc. is a count of channel sensors, illustrating how many channel sensors are counted in the 64 second period, necessary to calculate for determining of power-cost. This is intended for when the receiver has lost sync and is coming back online when trying to achieve sync, having received a first signal "hit", and looking for the confirming one. It is not applicable where the receiver has not lost sync but is not receiving any signals, as in traveling through a tunnel.

Figure 7:
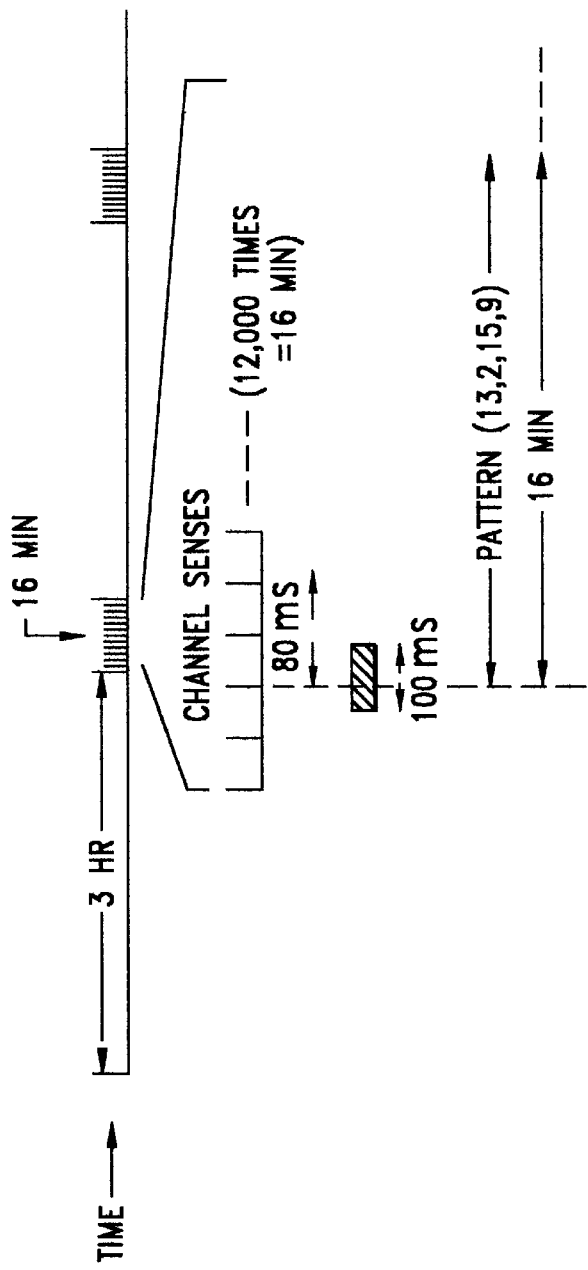
FIG. 7 is a diagram showing a synchronizing cycle following a three-hour quiescence of the receiver in accordance with the invention, using the channel sensing of FIG. 4.

A sample of conditions after the before-described exemplary three-hour receiver quiescence and in which syncing up is required, is shown in FIG. 7. After such three-hour quiescence, the receiver has awaked for 16 minutes, and invokes transmitter channel sensing every 80 milliseconds. With a minimum message of 100 milliseconds, the receiver, as earlier pointed out, can receive a message within the 80 milliseconds and can then effect one of these search patterns, looking for a confirming signal; and, with that search pattern taking 16 minutes, assuming a signal was there. The bracketed pattern numbers 13, 2, 15 & 9 in FIG. 7 correspond to the expanding window search pattern letters k, j, n and m, above described, in FIG. 6. This means that starting with 13 channel sensors and doing that twice, and then increasing by 2 until the whole sequence has repeated 15 times, the window is increased every 9 scans, or windows. The "12,000 times" references in FIG. 7 is within a period of 16 minutes. This is a calculation of how much it costs in power for each channel sensing and prevents exceeding the budget.

Figure 8:
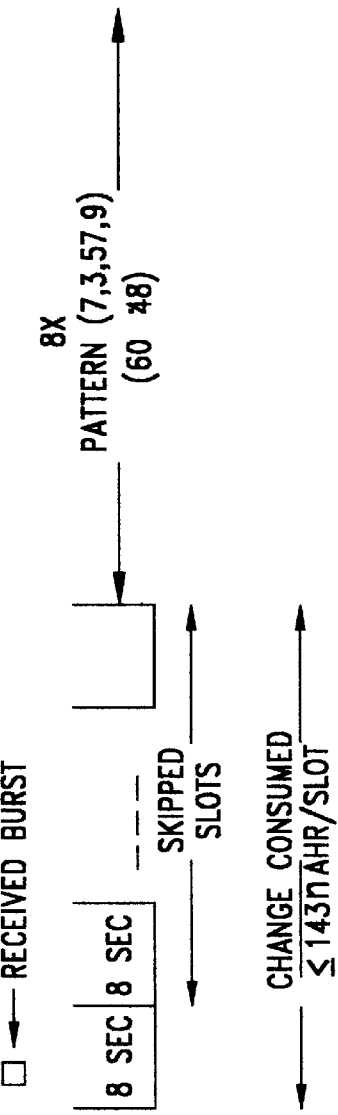
FIG. 8 is a diagram illustrating the skipping of slots after receiving a message signal burst to get back on power consumption budget allocation.

In FIG. 8, the before-mentioned skipping of slots to regain budget power or bridging of gaps is addressed, determining, when a burst is received, how to skip 8 second slots until the channels are tuned by all those slots remaining in the budget. As shown, the illustrative budget prorated per slot over the lifetime of the battery is 143 nanowave hours per slot. It is just a matter of skipping the predetermined right number of slots, depending on how many messages were in the burst. Once back on that budget, the receiver then proceeds with the 8 search patterns,—starting with 7 channel sensors in the window, FIGS. 6 and 7. The pattern of the numbers of FIG. 8, (7,3,57,9), (corresponding to k, j, n, m of FIG. 6) describes how, if a message burst is received in the leftmost 8-second slot in the diagram of FIG. 8, a number of subsequent slots is skipped-adapted to be enough that the total number of operational time slots consumed from those slots and including the first slot of the burst, will save 143 nanoseconds of power per slot, thus getting back on budget. The receiver thus executes in each time slot, a search pattern starting out with 7 channel sensors in a window, maintained for N×64 seconds, as earlier described in connection with FIG. 6, and then increasing the number of channel sensors by two at that point and at every 64 second period thereafter until there have been a total of 57 tries. That whole process takes 60 minutes and 48 seconds in this example. When the receiver is successful in receiving a message before this 60 minutes and 48 seconds has expired, then this process starts all over again.

This is an approach entirely opposite to that of prior art receiver energy conservation techniques. In the groups of prior art patents, above-referenced, the concept has been to try to minimize the energy consumption, but when the receiver runs out of power, it runs out of power and there can be no guarantee that the battery is going to last for any period of time. In accordance with the present invention, on the other hand, the use of energy is minimized by shut-down when transmissions are not present and when the transmitted signal is not intended for that receiver; and periods of reception and searching by the receiver are skipped, as appropriate, to keep the system within the energy budget while insuring satisfactory reception monitoring and with a guaranteed predetermined lifetime of battery power.

An illustrative application of the above-described technique of the invention for a self-contained vehicle transponder for vehicle theft recovery would be a miniature transponder with integral batteries intended for a 3 year (or longer) life energy budget (mostly waiting for the vehicle to be stolen), enabled to receive transmission within 3 hours after entering a transmitter array coverage area, FIG. 7, and able to receive up to 1 hour after last contact. The transmitter (eight for the "LoJack" type operation as above described) transmits activation messages upon notification of a stolen vehicle only at fixed times, with each transmitter transmitting at least every 16 minutes, using data frames with check lists up front in the activation message transmissions, FIG. 2.

As before described, the receiver performs recorded transmission channel sensing upon wake-up before committing to decode the message, evaluating the signal-to-noise ratio of the received transmission, FIG. 4, and the presence of modulation, in 3 ms channel sense periods. Symbol synchronization is performed as described, FIG. 5, rapidly locating the symbol boundaries of the message and using known preamble patterns. Data synchronization is achieved by looking for a flag pattern in the received message which is taken as evidence of a transmitter on channel, FIG. 2. If a mismatch occurs in the leading bits that contain information reflecting the whole message (i.e. the received message is not intended for that receiver) the power is removed between the messages in a burst. The system uses the previously explained expanding windows, FIG. 6, wherein the wake-up and channel sense occurs every 30 ms, such initial time period accommodating uncertainty as to the transmission time—the expansion accommodating for clock digit.

An allocated figure budget per 8-second slot of 143 nAhr/slot is most suitable, with skip slots to get back on budget after receiving, as earlier explained. The total overall receiving budget is 1753 mAhr, assuming a 3 hour "sleep" as before described, and 16 min. hunts for transmission, with 80 ms between transmission channel senses. For the previously described bridging gaps, a budget of 1454 mAhr is appropriate for the illustrated search patterns for each transmitter, looking at probabilistic averages.

Suitable apparatus architecture uses a Phillips 83L51FB microprocessor (FIGS. 3 and 4) with low power "sleep" mode and edge capture; and a PCF 8593 real time clock, FIG. 3, with settable alarms, and alarm output triggering wake-up pulses.

Consumable battery capacity may be 2200 mAhr for a receiver drawing a current of 3.48 mA. Suitable processor currents (12 MHz crystal, FIG. 3) are: active mode, 6.21 mA; idle mode, 2.1 mA; power down 3.36 MA, including standby current for the clock and other chips; crystal start, 1.0 mA; and clock, 200 MA. Typical startup times for the receiver are of the order of 2.5 ms; for the processor, 1.0 ms; and for the transponder reply transmitter, 20 ms.

While the above are preferred values for a successfully tested system, variations may, of course, be made within the scope of the methodology of the invention; and the technique may more generally be applied to other receiver and electronic apparatus as well, where the power conservation features of the invention are desired. Further modifications will also occur to those skilled in this art, and such are considered to fall within the spirit and scope of the invention as defined in the appended claims.

What is claimed is:

1. A method of energy source utilization and conservation at a radio receiver intended to receive only occasional radio transmissions addressed to that receiver and occurring during predetermined overall transmission time schedules, that comprises, allocating successive short time periods of possible equal-energy utilization by the receiver totaling an energy budget capacity of the intended lifetime of the receiver energy source; momentarily activating the receiver by applying energy thereto during such a short time period only, adequate for the receiver to determine the possible presence of a radio transmission containing an address for that receiver; thereupon de-activating the receiver by terminating energy applied thereto in the absence of receipt of such addressed transmission; and skipping subsequent time periods of possible activation corresponding at least to the time period(s) utilized in such determination when no such transmission was found to be present in order to insure overall conformance to said energy budget, but adjusting such skipping to insure the activation of the receiver at some time within the predetermined transmission schedules, thereby enabling the receiver judiciously to look for transmissions addressed to it only at correct times and only for short time periods, while spending the rest of the time in an energy conservation deactivated mode.

2. A method as claimed in claim 1 wherein the short time periods are of the order of about 8 seconds and the predetermined transmission schedule is of the order of about 16 minutes.

3. A method as claimed in claim 1 wherein, upon receiver activation, any received transmission is first sensed to evaluate its adequacy and the presence of modulation before committing to decode the address, and, if adequate and containing modulation, is then at least partially decoded to determine if it is actually addressed to that receiver.

4. A method as claimed in claim 3 wherein the sensing is effected in a time of the order of about 3 ms.

5. A method as claimed in claim 3 wherein the message modulation in the transmission is provided in the format of leading preamble and flag bits preceding address bits.

6. A method as claimed in claim 5 wherein the address bits are preceded by one or more of VRC, LRC and FON Code, and followed by CRC bits.

7. A method as claimed in claim 5 wherein information specific to the address and reflecting the whole message is contained in the leading bits preceding the address, enabling the prompt determination as to whether the transmission is or is not intended for that receiver and thereby avoiding the wasting of energy in proceeding to decode the address bits if the message is not intended for that receiver.

8. A method as claimed in claim 7 wherein, prior to any message decoding, symbol synchronization is effected by fast location of the preamble, and data synchronization is effected by determining the flag bit pattern.

9. A method as claimed in claim 5 wherein the sensing evaluation of the received transmission is effected by evaluating the signal-to-noise ratio.

10. A method as claimed in claim 1 wherein, in the absence over a set time of a received transmission intended for a receiver, the energy activation potential is rendered dormant for several hours.

11. A method as claimed in claim 10 wherein, after the elapse of such several hours, the energy activation potential is restored by receiver transmission reception sensing over a time period corresponding to within the said transmission schedule.

12. A method as claimed in claim 11 wherein said set time is adjusted to the order of about an hour.

13. A method as claimed in claim 1 wherein, in the absence of reception of a transmission intended for that receiver, a window for the receiver searching for transmissions is expanded.

14. Radio receiver apparatus powered by an expendable energy source and in which a radio receiver is intended to receive only occasional radio transmissions addressed to that receiver and occurring during predetermined overall transmission time schedules, said apparatus having, in combination, microprocessor-controlled means providing for allocating successive short time periods of possible equal-energy utilization by the receiver totaling an energy budget capacity of the intended lifetime of the receiver expendable energy source; means for momentarily activating the receiver by applying energy thereto during such a short time period only, adequate for the receiver to determine the possible presence of a radio transmission containing an address for to that receiver; thereupon de-activating the receiver by terminating energy applied thereto in the absence of receipt of such addressed transmission; and means for skipping subsequent time periods of possible activation corresponding at least to the time period(s) utilized in such determination when no such transmission was found to be present in order to insure overall conformance to said energy budget, but said skipping means adjusting such skipping to insure the activation of the receiver at some time within the predetermined transmission schedules, thereby enabling the receiver judiciously to look for transmissions addressed to it only at correct times and only for short time periods, while spending the rest of the time in an energy conservation deactivated mode.

15. Apparatus as claimed in claim 14 wherein the short time periods are of the order of about 8 seconds and the predetermined transmission schedule is of the order of about 16 minutes.

16. Apparatus as claimed in claim 14 wherein, upon receiver activation, means is provided for first sensing any received transmission to evaluate its adequacy and the presence of modulation before committing to decode the address, and, if adequate and containing modulation, decoding at least partially to determine if the received transmission is actually addressed to that receiver.

17. Apparatus as claimed in claim 16 wherein the sensing is effected in a time of the order of about 3 ms.

18. Apparatus as claimed in claim 16 wherein the message modulation in the transmission is provided in the format of leading preamble and flag bits preceding address bits.

19. Apparatus as claimed in claim 18 wherein the address bits are preceded by one or more of VRC, LRC and FON Code, and followed by CRC bits.

20. Apparatus as claimed in claim 18 wherein information specific to the address and reflecting the whole message is contained in the leading bits preceding the address, enabling the prompt determination as to whether the transmission is or is not intended for that receiver and thereby avoiding the wasting of energy in proceeding to decode the address bits if the message is not intended for that receiver.

21. Apparatus as claimed in claim 20 wherein, prior to any message decoding, symbol synchronization means is provided to effect fast location of the preamble, and data synchronization is effected by means for determining the flag bit pattern.

22. Apparatus as claimed in claim 18 wherein the sensing evaluation of the received transmission is effected by means for determining and evaluating the signal-to-noise ratio.

23. Apparatus as claimed in claim 22 wherein means is provided for measuring the signal-to-noise by comparing two-level audio frequency components fed along one path of the received signal that generate 0 and 1 bits, with higher frequencies monitored along another path indicative of noise in the absence of a signal.

24. Apparatus as claimed in claim 14 wherein, means is provided operable in the absence over a set time of a received transmission intended for a receiver, for rendering the energy activation dormant for several hours.

25. Apparatus as claimed in claim 24 wherein, means is provided operable after the elapse of such several hours, for restoring energy activation potential to enable receiver transmission reception sensing over a time period corresponding to within the said transmission schedule.

26. Apparatus as claimed in claim 25 wherein said set time is adjusted to the order of about an hour.

27. Apparatus as claimed in claim 25 wherein means is provided for synchronizing the receiver upon such restoration of energy activation, by measuring a plurality of successive transmission time intervals corresponding to 0 and 1, and determining from averaging a fix of an initiating time upon such activation.

28. Apparatus as claimed in claim 27 wherein means is provided for determining the sums of alternate time interval 1's and finding the smallest sum.

29. Apparatus as claimed in claim 14 wherein means is provided, operable in the absence of reception of a transmission intended for that receiver for expanding a window for the receiver searching for transmissions.

30. Apparatus as claimed in claim 29 wherein means is provided for effecting successive incremental expansions by the expanding means if no transmitted signal is received in successive time periods over a predetermined time interval.

* * * * *